May 13, 1969   G. A. BEKEY   3,444,361
METHOD AND MEANS OF GENERALIZED INTEGRATION
Filed Oct. 15, 1959   Sheet 1 of 3

INVENTOR.
GEORGE A. BEKEY
BY
Lippincott & Ralls
ATTORNEYS

May 13, 1969            G. A. BEKEY            3,444,361

METHOD AND MEANS OF GENERALIZED INTEGRATION

Filed Oct. 15, 1959

INVENTOR.
GEORGE A. BEKEY
BY
Lippincott & Ralls
ATTORNEYS

United States Patent Office 3,444,361
Patented May 13, 1969

3,444,361
METHOD AND MEANS OF GENERALIZED INTEGRATION
George A. Bekey, Venice, Calif., assignor to Beckman Instruments, Inc., Fullerton, Calif., a corporation of California
Filed Oct. 15, 1959, Ser. No. 846,657
Int. Cl. G06g 7/18
U.S. Cl. 235—183                         13 Claims

ABSTRACT OF THE DISCLOSURE

The present invention relates in general to an analog method of electronically performing a direct integration of a variable with respect to a dependent variable, and to circuitry in connection therewith.

---

The mechanized performance of integration operations is well known in the art, and may, for example, be readily accomplished by a mechanical differential analyzer. In the provision of computing devices adapted to provide solutions to mathematical problems, it is highly desirable to be able to perform integration with respect to an arbitrary variable. Thus, for example, the differentiation of an equation may lead to a considerable simplification thereof, but may in the process introduce differentials of dependent variables if the equation is nonlinear or has time varying coefficients. The solution of such problems requires a generalized method of integration which is capable of integrating with respect to a dependent variable. Various problems in polar coordinates require the simultaneous integration with respect to both the radius and the angle, and certain analytic functions of dependent variables as well as transformations from polar to rectangular coordinates all require the performance of an integration with respect to dependent variables.

Mechanical differential analyzers are suited to the integration herein described through the use of a Kelvin disc integrator, wherein a rotary mounted wheel engages a turntable at a variable radius of the latter, so that the angular displacement of the small wheel is proportional to the turntable radius at which the small wheel engages the turntable times the displacement of the small wheel upon the turntable. This relationship is found to hold for variations in either direction, so that the relationship is not restricted to a single polarity. Although devices of this type are well known, same are largely limited because of the size thereof, as well as the slow speed of operation and the excessive time required to place problems into such devices.

The electronic differential analyzer has been developed as a portion of an electronic analog computer to replace the mechanical differential analyzer and to overcome the above-noted difficulties and limitations thereof. Insofar as analog methods are concerned, wherein the sense of the problem is retained throughout solution thereof, the electronic differential analyzer is seriously limited. Electronic analog integration generally requires a multitude of operations, which tend to introduce substantial errors in the end result. In the instance wherein integration with respect to a dependent variable is required, the solution provided is valid only over certain limited portions of the relationship. Thus, an integration which may be performed by a mechanical differential analyzer, wherein there is obtained a result $z = k \int y\, dx$ may be performed on an electronic analog computer by employing the relationship $$z = \int_{x_1}^{x_2} y\, dx = \int_{t_1}^{t_2} y\left(\frac{dx}{dt}\right) dt$$

This relationship assumes that $x$ is the monotonic function of time $t$, so that the change of limits indicated may be performed. If this function is not monotonic, it will be seen that $t$ is a multiple valued function of $x$, and the relationship is only valid over certain intervals of time wherein the function is, in fact, single valued. It will be seen from the foregoing that the evaluation with an electronic analog computer of the general integral noted above, requires differentiation, multiplication, and time integration. Of these three operations required to accomplish generalized integration, the differentiation poses the greatest difficulties. It is necessary in connection therewith to seriously restrict the frequency response, in order to keep the noise level within acceptable amplitude limits without introducing excessive phase shift. Although various approaches to the problem of differentiation are possible, they are all apparently subject to serious limitations as regards accuracy, noise, and frequency response, so that it is apparent that material disadvantage normally attaches to integration requiring differentiation of the integrand.

The present invention provides a generalized integration method which is not subject to the difficulties and limitations of the prior art noted above. The method herewith contemplates the summation of a series of values of one variable of an integrand, in accordance with predetermined sampling of the variable of integration. This generalized method of integration is useful for a wide variety of function generation, such as, for example, the generation of logarithms, powers, trigonometric functions, and the like.

It is an object of the present invention to provide an improved analog method of generalized electronic integration.

It is another object of the present invention to provide a method of generalized integration by the summation of a series of values of one variable obtained by sampling at constant intervals in the variable of integration.

It is yet another object of the present invention to provide method and means of generalized integration by analog methods without the inclusion of differentiation in the integration process.

It is a further object of the present invention to provide an improved analog integrator circuit.

It is a still further object of the present invention to provide improved and simplified methods and means for function generation.

Another object of the present invention is the provision of method and means for the generation of logarithms, squares, and trigonometric functions of a varying voltage signal.

Various other possible objects and advantages of the present invention will become apparent to those skilled in the art from the following description of the method and means for the present invention; however, no limitation is intended by the terms of such description, and, instead, reference is made to the appended claims for a precise delineation of the true scope of the present invention.

The invention is illustrated in the accompanying drawings, wherein.

Figure 1:
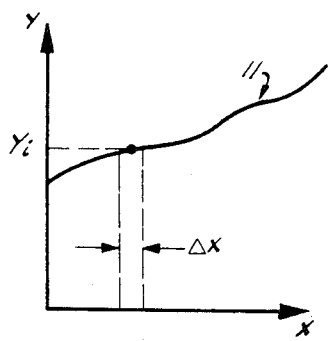
FIG. 1 is a graphic illustration of a curve representing the variation of a value $y$ in terms of a value $x$.

Considering first the generalized integration method of the present invention, and referring to FIG. 1, it may be noted that the area under the curve 11 thereof, between appropriate limits, represents the integral of the curve represented in terms of $x$ and $y$, therein identified. This area under the curve may be divided into a series of vertical strips of equal width $\Delta x$, and with the values of the ordinate of the curve at the center of each of such strips being represented by $y_i$, it is then possible to form the relationship $$F = \int_{x_1}^{x_n} y\,dx = \lim_{\Delta x \to 0} \sum_{i=1}^{n} y_i \Delta x$$

under the conditions wherein $\Delta x$ is quite small, this may be reduced to $$F \cong (\Delta x) \sum_{i=1}^{n} y_i$$

In accordance with the above relationship, it will be seen that the evaluation of the integral may be obtained by a summation of a series of values of $y$ which are, in turn, obtained by sampling at constant intervals in the variable of integration $x$. Accomplishment of the foregoing is herein carried out by the sampling of a voltage signal $x$, and the comparison of same with a later value of $x$ to thereby produce $\Delta x$. In accordance herewith a preset value of $\Delta x$ is employed, so that values of $y_i$ added together into a summation are obtained at equal separations of the value of $x$. In order to accommodate the possibility of $x$ increasing or decreasing, there is herein employed both a positive and negative polarity of the voltage signal $y$, and a choice is made as to which of these polarities is employed in accordance with whether $\Delta x$ is plus or minus. The sampled values of $y$, which are produced in accordance with the production of successive $\Delta x$'s, are summed up in an integrator which behaves as an accumulator by integrating the input voltage for a fixed period of time. If this period of time is sufficiently small, it can be assumed that $y$ will remain consant during such period, so that the output of the accumulator will consist of a staircase of integrated signals. More generally, the method hereof consists of the continuous sampling of a first variable voltage $x$, to produce control signals from same upon the occurrence of a predetermined change therein. These control signals are, in turn, employed to determine the polarity of a second variable voltage to be sampled. Additionally, these control signals are utilized to establish a sampling period, which is maintained quite small and during which the second variable voltage is sampled and applied to a summation. These consecutive values of the second variable voltage are added together to form a summation which is proportional to the integral of the product of $ydx$.

The above-described method of the present invention may be best illustrated as to applicability by the consideration of a simplified circuit adapted to carry out the steps of the method of this invention. In this respect, attention is invited to FIG. 2 of the drawing, wherein an input terminal 21 is adatped to receive a variable voltage $x$ serving to represent the variable of integration to be performed. A pair of other input terminals 22 and 23 are connected to receive positive and negative polarity voltages of a variable voltage $y$, forming the integrand. Input terminal 21 is connected to a circuit 24 adapted to produce $\Delta x$ signals of a predetermined amplitude and of a polarity depending upon the direction of variation of the input signal $x$. This circuit 24 may include an integrator 26 connected through a switch arm 27 of a switch #3A, and a resistor 28, to the input terminal 21. A resistor 29 is connected about the integrator and switch, while the output of the integrator 26 is connected to an amplifier 31, with the input terminal 21 also being directly connected to an input of this amplifier. The integrator 26 is connected as a sample and hold ciricut, so as to produce at the output thereof a voltage $x_i$, representing the value of $x$ at the last sample. With the amplifier 31 receiving both the present value of $x$ and the previous value of $x$ at the last sampling period, the values are combined in the amplifier to produce an output of $\Delta x$, or, more accurately $k\Delta x$, inasmuch as a constant of integration is involved. The output from the circuit 24, which may be considered to be $\Delta x$ for the present purposes, has either a positive or negative value, depending upon whether the voltage $x$ is increasing or decreasing, and this control signal $\Delta x$ from the circuit 24 is applied to a switch #1 control 32. Control over the sampling of the $y$ voltage is accomplished as to polarity thereof, by this switch #1 control 32, in a manner set forth below. The control signal $\Delta x$ is also applied, as to absolute value thereof, to a switch #2 control 33. The absolute value of $\Delta x$ is obtained for the input to switch control 33 by a conventional circuit 34 inserted in the connection between the circuit 24 and the switch control 33. By way of example, the absolute value circuits shown and described on pages 119 and 120 of the book entitled "Analog Computer Techniques" by Clarence L. Johnson, published in 1956 by the McGraw-Hill Book Company, Inc. may be utilized in this invention.

Figure 2:
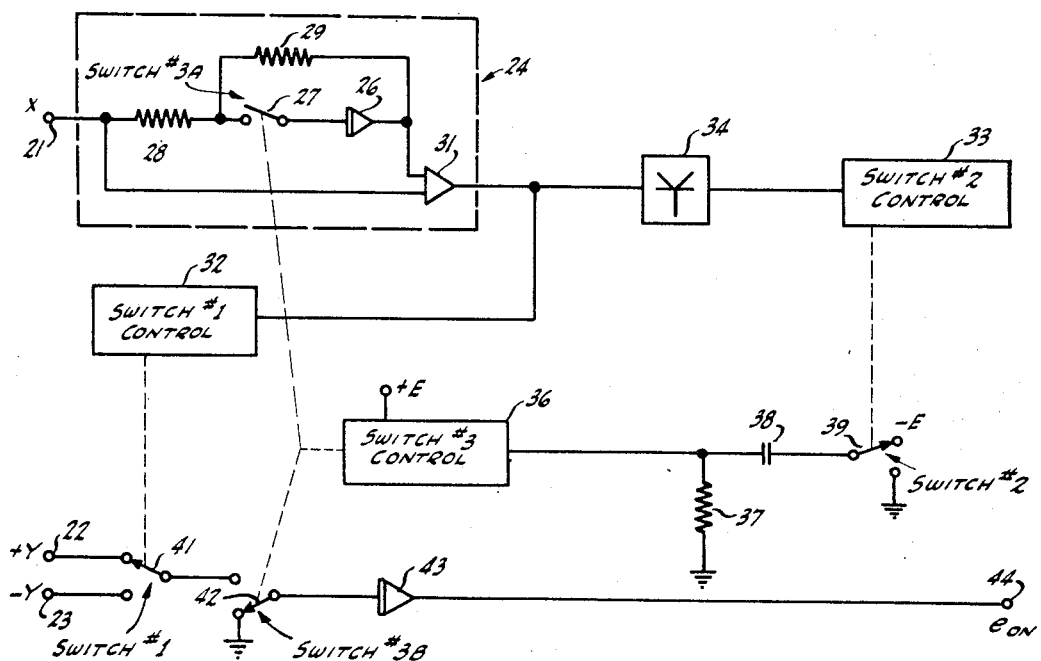
FIG. 2 is a schematic block diagram of an electronic generalized integrator, in accordance with the present invention.

As a further portion of the circuit of FIG. 2, there is provided a switch #3 control 36, which has the input thereof grounded through a resistor 37 and coupled through a capacitor 38 to a switch arm 39 of switch #2. The switch arm 39 is adapted to move between a grounded terminal and a second terminal connected to a source of negative voltage —E, as indicated in the drawing. The switch arm moves in response to signals received by switch #2 control 33, described above. Also connected to switch #3 control 36 is a source of positive voltage +E, as indicated, and it will be seen that movement of the switch arm 39 to the grounded terminal of switch #2 will actuate switch #3 control 36 for a predetermined period of time. This switch #3 control serves to control the switch arm 27 of switch #3A, coupling the integrator 26 to the input terminal 21. Switch arm 27 may thus be considered to form a part of switch #3, and will open and colse in response to operation of the switch #3 control 36.

A further and final portion of the circuit of FIG. 2 includes a switch #1 controlled from switch #1 control 32, having a switch arm 41 movable between the +y and —y input terminals 22 and 23. This switch #1 arm 41 is directly connected to one terminal of switch #3B, operating in response to switch #3 control 36 and having an arm 42 movable between a grounded connection and switch arm 41 of switch #1. The switch arm 42 of switch #3B connects to the input of an integrator 43, which serves to produce a summation of sampled values of the integrand $y$ applied thereto in response to the samples of the integration variable $x$, as determined above. The output of the integrator 43, which herein serves as an accumulator, is connected to an output terminal 44, whereat there appears an output voltage $e_{on}$.

Considering now the operation of the circuit of FIG. 2, in terms of the method set forth above, it will be seen that the integrator 26, which is connected as a sample-and-hold device, produces an output representing the value of $x$ at the last sample, $x_i$, and that upon the application of same to the amplifier 31, together with the present value of $x$, there is produced a control signal $\Delta x$, equal to $x-x_i$ operable to actuate switch #1 control 32 and switch #2 control 33. Switch #1 control 32 is responsive to + or − values of the control signal $\Delta x$ to thereby move the switch arm 41 of switch #1 between the positive and negative terminals 22 and 23. Consequently, switch #1 passes either positive or negative values of the voltage $y$, in accordance with the direction of variation of the variable voltage $x$. Switch #2 control 33 is also actuated by the control signal $\Delta x$ to thereby move the switch arm 39 of switch #2 from the terminal connected to −E to the grounded terminal of such switch. This thereupon actuates switch #3 control 36, so as to move the switch arms 27 and 42 of switches #3A and #3B, respectively. There will thus be seen to be applied to the integrator 43, successive values of the integrand voltage $y$. The integrator 43 operates to integrate the input voltage for a fixed period of time, and to serve as an accumulator, wherein the output thereof is a summation of input signals. The timing circuit, including switch #3 control, serves to produce a clipped pulse of controllable duration, determining the integrating time in the integrator 43, and as noted above, this time is maintained quite short, so that it may be assumed that $y$ remains constant during such periods.

A mathematical consideration of the procedure set forth above may be obtained by considering the output of the integrator 43 at the $n$th sampling time as being given by the relationship $$e_{on} = e_{o(n-1)} \int_{t_n}^{t_n + \Delta t} y_n dt$$

where $\Delta t$ is the sampling time and $e_{o(n-1)}$ is the output of the integrator after the $(n-1)$ sampling pulse. Inasmuch as $e_{on} = e_{o(n-1)} + y_n \Delta t$, and each sample contributes a voltage $y_i \Delta t$, the relationship may be otherwise written as $$e_{on} = (\Delta t) \sum_{i=1}^{n} y_i$$

It was noted above that the desired integral $$F \cong (\Delta x) \sum_{i=1}^{n} y_i$$

so that by appropriate substitution it thus follows that $$F \cong \left(\frac{\Delta x}{\Delta t}\right) e_{on}$$

and consequently, the summation output of the final integrator 43 is proportional to the value of the generalized integral.

With regard to actual electronic circuitry which may be employed to carry out the present invention, a relatively wide latitude of choice is available. Thus, relays may be employed as the switches and associated switch controls illustrated in FIG. 2. Switch #1 control 32 and switch arm 41 may thus comprise a polarized relay such as is shown on page 25 of the book entitled "Switching Circuits and Logical Design" by Samuel H. Caldwell, published in 1958 by John Wiley & Sons, Inc. Switch #2 control 33 and switch arm 39 may comprise an ordinary electromagnetic relay such as is shown on page 15 of the book entitled "Switching Circuits and Logical Design," supra. Switch #3 control 36 and switch arms 27 and 42 may comprise a polar relay such as is shown on page 386 of the book entitled "The Design of Switching Circuits" by Keister, Ritchie and Washburn, published in 1951 by D. Van Nostrand Company, Inc. It is, however, highly desirable that very rapid switching rates be attained, so that electronic switches are preferable in this respect. It is also necessary that the integration period $\Delta t$ shall be long compared to the switch throw time to obtain repeatable performance, and this further dictates the utilization of electronic switching. It is to be particularly noted as regards the method hereof, and the apparatus illustrated for accomplishing same, that the sampling interval $\Delta x$ is herein measured in voltage amplitude, rather than time. This sampling interval must be particularly selected so that the highest frequency of interest in the variable $x$ will yet provide the time between two samples in $x$ which is sufficiently long in comparison to the integration interval $\Delta t$. Electronic switches, such as a four-diode gate, may be employed in the electronic circuitry for accomplishing the method of the present invention, and it is possible by the utilization of same, to achieve accuracies of the order of 0.01 percent for low frequencies, with a reasonable decrease in accuracy for higher frequencies in either $x$ or $y$.

An electronic circuit constructed in accordance with FIG. 2 and utilizing only readily available electronic components without serious effort to maximize switching speeds, as discussed above, provided a sampling pulse width (switch closure time) of about 0.5 millisecond in order to allow about ten time constants for the circuit 26 to approach to within 0.01 percent of input. If the sampling period $\Delta t$ is chosen as 0.5 millisecond, the samples of $x$ should be spaced sufficiently widely to allow $\Delta t$ to be smaller than the minimum time between samples of $x$. An arbitrary choice may be made of one millisecond, which would then be equal to $\Delta t$, and from this it is possible to determine the maximum slope of $x$ from the relation:

$$(dx)/(dt)_{max} = \Delta x / 2\Delta t$$

If it be assumed that $\Delta x$ is chosen as 0.1 volt, then the maximum slope of $x$ will be restricted to 100 volts per second, and although this is quite restrictive, it is believed apparent that same is only indicative of suitable operation of the circuit, inasmuch as improvement in the sampling circuit time constant may be attained by other switching means.

The method and means of the present invention are widely applicable for the generation of analytic functions of dependent variables. Many such functions require integration with respect to a variable, and thus the present invention is highly useful in the generation of functions such as $e^x$, log $x$, and the like. It is also possible in accordance herewith, to generate sines and cosines of dependent variables without resolvers, by using the particular circuits set forth below, and also, it is possible to obtain the product of two variables integrated with respect to time, without employing a multiplier, also in accordance with the circuits set forth below. Considering now a variety of function generators employing integration with respect to a dependent variable in accordance with the present invention, reference is made to the remaining figures of the drawings.

Figure 3:
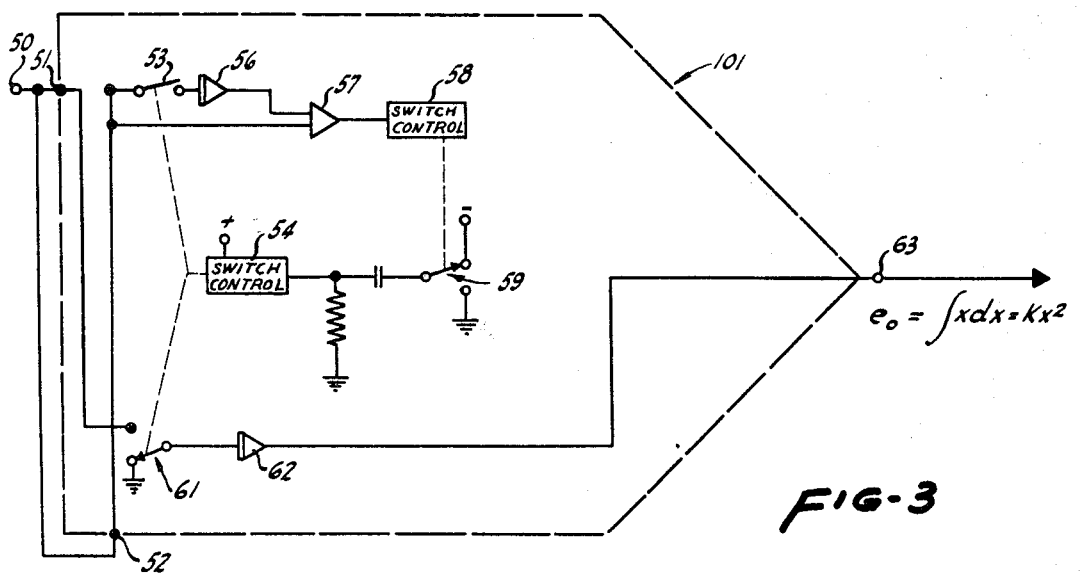
FIG. 3 is a simplified illustration of an electronic circuit in accordance herewith, adapted to produce a signal which is proportional to the square of an input signal.

There is illustrated in FIG. 3 of the drawing a circuit serving as a function generator to produce an output voltage which is proportional to the square of an input voltage, and including the generalized integrator of the present invention. As may be seen by reference to FIG. 3, the generalized integrator thereof may be somewhat simplified inasmuch as no provision need be made for positive and negative polarities of a voltage to be sampled. A single input terminal 50 is directly connected to both the integrand input terminal 51 and the integration variable input terminal 52 of the integrator so that a variable voltage $x$ applied to the input terminal 50 will be directly applied to both the control and sampling portions of the integrator. The integration variable input terminal 52 is connected through a switch 53, having control means 54, to the input of an integrator circuit 56, herein serving as a sample-and-hold device, in the manner described above with respect to FIG. 2. This input terminal 52 is also directly connected to one input of a summing amplifier 57 which has the other input thereof connected to the output of the integrator 56. There will thus be seen to be produced at the output of the summing amplifier 57, a control signal or voltage representative of a value $\Delta x$, the change in value of the input voltage from one sampling period to another. This control signal is applied from the output of the sampling amplifier 57 to a switch control means 58 which serves to actuate a switch 59 in response to the receipt of signals from the summing amplifier. The switch 59 is connected in a timing circuit and, as illustrated, has an arm that is movable between a grounded terminal and another terminal connected to a source of negative voltage so as to control operation of the switch control 54. A capacitor is connected between the arm of switch 59 and switch control 54 and a resistor connected to this connection is grounded, all in the manner set forth above in connection with FIG. 2. The sampling portion of the integrator hereof is, as noted above, simplified in the respect that no provision is made for the receipt of both positive and negative polarity input voltages thereto. Thus, in this instance there need be provided in the sampling circuit only a single switch 61, having one terminal thereof connected to the integrand input terminal 51 and the other terminal thereof grounded. The switch arm of this switch 61 is directly connected to the input of an integrator 62, and the switch 61 is also controlled as to operation by the switch control means 54. The output of the integrator 62 is directly connected to an output terminal 63 of the function generator.

As regards operation of the circuit of FIG. 3, it will be seen that a variable voltage $x$ applied to the input terminal 50 is directly applied to both of the integrator terminals 51 and 52, and furthermore, that the generalized integrator, herein indicated by the numeral 101 and enclosed by dashed lines, functions in substantially the same manner as the generalized integrator of FIG. 2 described above. The summation of separate values of $x$ is accomplished in the integrator 62 herein serving as an accumulator. The sampling operation performed by the switch 61 is controlled to occur at equal intervals of change of the voltage $x$, so that there is then produced at the output terminal 63 a voltage which is proportional to the integral of $xdx$, as noted by the legend on the drawing of FIG. 3. This integral may be otherwise written as being proportional to $x^2$, as is also indicated upon FIG. 3. It will be appreciated that the function performed by the circuitry of FIG. 3 is materially simplified from that available from various prior-known methods and apparatus for producing functions of this type. There is, in fact, employed no multiplication circuits in the function generator of FIG. 3, in contrast to more conventional methods of obtaining squared values of a voltage signal.

Figure 4:
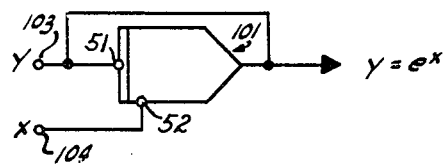
FIG. 4 is a simplified diagram of a circuit in accordance with the present invention, adapted to produce an output signal which is raised to the power of the input signal.

The circuit of FIG. 4 is adapted to produce the function $e^x$ and such is therein accomplished by the provision to an integration variable sampling input terminal 104 of an $x$ input signal, and by the provision to the integrand input terminal 103 of a signal $y$ which forms the output of an integrator 101 such as that described above. The output of the integrator 101, herein denominated as $e_0$, will thus be seen to be equal to $y$, which is, in turn, equal to $\int ydx$. The expression $y=\int ydx$ will be seen to reduce to $y=e^x$, so that the output of this circuit will thus be seen to be the $x$ power of $e$.

Figure 5:
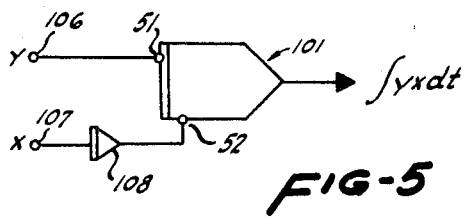
FIG. 5 is a function geneartor producing an output signal proportional to the integral of the product of a pair of input signals with respect to time.

The circuit of FIG. 5 also includes the integrator circuit 101 of the present invention, with a signal $y$ being applied at an input terminal 106, connected to the integrand terminal 51, and a signal $x$ being applied at a terminal 107. In this circuit an integrator 108 is connected between the input terminal 107 and the sampling integration variable input 52, so as to produce a signal $\int xdt$ as the signal to be sampled by the integrator 101, and it will be appreciated that the output of the overall circuit of FIG. 5 is thus $\int yxdt$. Here again, there is produced an integration of the product of two values with respect to time without the use of multiplying circuits.

Figure 6:
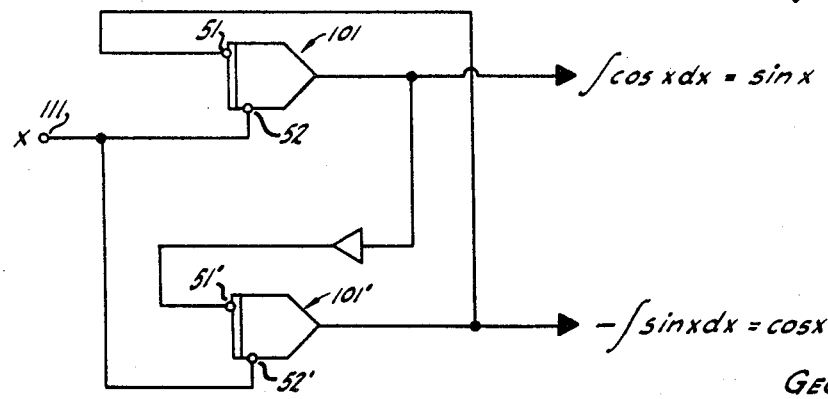
FIG. 6 is a block diagram of an electronic circuit adapted to produce trigonometric function of an input signal.

The circuit of FIG. 6 is adapted to produce trigonometric functions and employs a pair of integrating circuits in accordance with the present invention and therein denominated as 101 and 101'. An input terminal 111 receives an input voltage $x$, which is applied to the sampling integration variable input terminals 52 and 52' of the two integrators 101 and 101'. The $y$ input signals for each of these integrators is obtained from the output of the opposite integrator, with an amplifier being connected between the output of the integrator 101 and the input of the integrator 101'. Through appropriate mathematical calculations and substitutions, it will be seen that the output of the first integrator 101 consists of $\int \cos xdx$, which equals $\sin x$, and the output of the second integrator 101' comprises $-\int \sin xdx$, which is equal to the $\cos x$. In this simple manner, it is thus possible to generate trigonometric functions by the use of the generalized integration method and means of the present invention.

Figure 7:
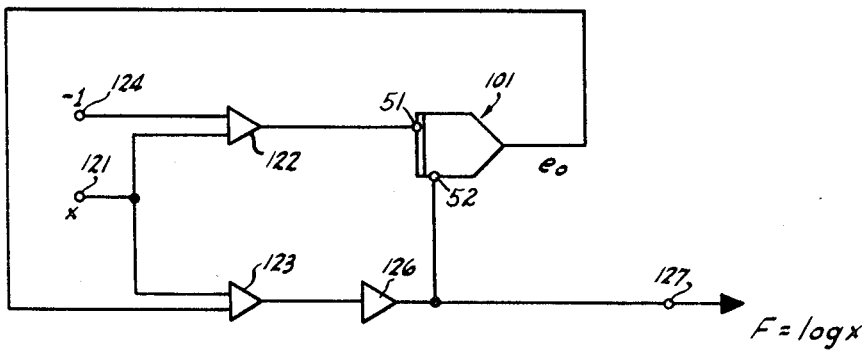
FIG. 7 is a block diagram of a logarithmic function generator.

The circuit of FIG. 7 is adapted to produce a log function of an input voltage, and here again there is incorporated an integrator 101 in accordance with the present invention. An input terminal 121 is adapted to receive an input voltage $x$, and the terminal is connected to the inputs of a pair of summing amplifiers 122 and 123. The amplifier 122, which also serves as an inverter, also has another input terminal 124 connected thereto, and there is applied to this second input terminal a constant input signal voltage, which may be considered to have the value of $-1$. The output of the amplifier 122 is connected to the integrand input terminal 51 of the integrator 101, and the output of this integrator 101, $e_0$, is applied to the other input of the amplifier 123. The output of the amplifier 123 is connected through an amplifier 126 to the sampling integration variable input terminal 52 of the integrator 101, and to an output terminal 127 of the circuit. Considering the operations herein performed, it will be seen that the output of the amplifier 122 constitutes the value $(1-x)$ and with the signal at the output terminal 127 being considered as F, i.e., the function desired, it follows that $e_0=\int(1-x)dF$. It is also apparent from a consideration of the circuit that $F=x+e_0$, and by substituting in this relationship the above-noted value for $e_0$, there is obtained the relationship $F=x+F-\int xdF$. This may be reduced to $x=\int xdF$ or $dx=xdF$. It will thus be seen that $dF=dx/x$ or that $F=\log x$. This circuit will thus be seen, by the combination of a few conventional elements with the generalized integration of the present invention, to produce a log function of an input signal.

Figure 8:
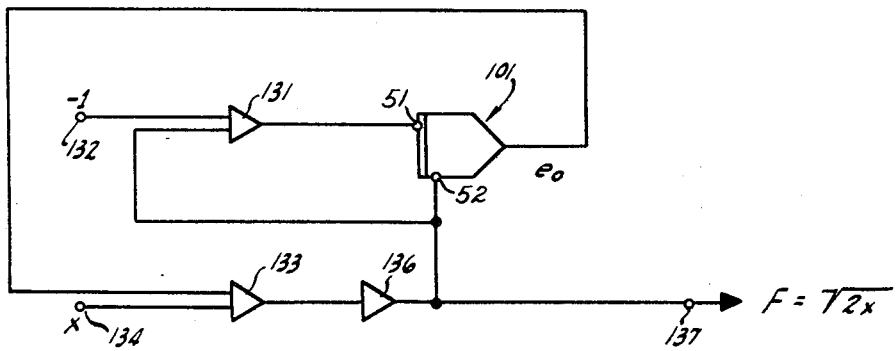
FIG. 8 is a block diagram of a square root function generator.

Relatively minor variations from the circuit of FIG. 7 described above, serve to produce a square root function generator. As illustrated in FIG. 8, an integrator 101, in accordance with the present invention, has an amplifier 131 connected to the integrand input 51 thereof and an input terminal 132 connected as one input of this amplifier. There is adapted to be impressed upon the input terminal 132 a voltage signal which may be considered to have a constant value of $-1$. The output $e_0$ of the integrator 101 is applied to one input of another summing amplifier 133, and a further input terminal 134 is connected as the other input of such amplifier. A variable voltage $x$ is adapted to be impressed upon the input terminal 134, so as to combine in the amplifier 133 with the voltage $e_0$ from the integrator 101. The output of this amplifier 133 is applied to a further amplifier 136, which is, in turn, connected to an output terminal 137. The output of the amplifier 136, and thus the output terminal 137, is coupled to the sampling integration variable input 52 of the integrator 101, and is also connected as an additional input to the amplifier 131. Considering now the mathematical operations occurring in the above-described circuit, it will be seen that the output voltage of the integrator 101 may be written as the relationship $e_0=\int(1-F)dF$, and furthermore, that the output voltage F at the output terminal 137 is equal to $x+e_0$.

By substituting the above-noted value of $e_0$ in the latter relationship, it will be seen that $F=x+F-\int FdF$ which reduces to $x=\int FdF$. This is the equivalent of $x=F^2/2$, and consequently, $F=\sqrt{2x}$. The output voltage F will thus be seen to be proportional to the square root of the input signal $x$, and such is herein accomplished with a material minimization of operations and in full accordance with the present invention set forth above.

Numerous other functions may be generated by the generalized integration method and means of the present invention, through suitable circuitry in the manner exemplified by the circuits of FIGS. 3 to 8, described above. It is to be noted that the generalized integration hereof does not include a differentiation step formerly necessary in the electronic analog solution of integrals. The errors and limitations attendant prior art methods and devices in this field are thus herein precluded, and a material advantage and simplification over the prior art is achieved. Not only does the present invention provide a materially simplified method of performing generalized integration, particularly as regards dependent variables, but also the applicability of the method and means of integration is materially extended over that available with the prior art.

What is claimed is:

1. A method of electronically performing mathematical integration of a first variable with respect to a second variable, comprising the steps of representing each of said variables by voltages varying in accordance thereto, establishing a predetermined incremental voltage, continuously sampling the second voltage and comparing a first value thereof with successive values thereof until the difference therebetween equals said incremental voltage to produce a control signal, repeating the above step with the basis of comparison in each case being the last value of said second voltage which produces the difference identity to thereby produce a succession of control signals separated by various increments of time which are dependent upon the rate of change of the second voltage, sampling said first voltage for separate periods separated by said time increments to establish a plurality of voltages proportional to the average values of said first voltage during said incremental sampling periods, and summing said plurality of voltages to produce a summation voltage proportional to the integral of said second voltage with respect to said first voltage.

2. A generalized method of electronically integrating with respect to a dependent variable, comprising the steps of representing a variable and a dependent variable with respect to which integration is to be performed by first and second voltage signals respectively, establishing successive sampling periods of time separation depending upon the rate of change of said second voltage, sampling said first voltage for said sampling periods, and producing incremental voltages equal to the average values of said first voltage during each sampling period, and summing said incremental voltages as a measure of the integral of said variables.

3. A method of integration as claimed in claim 2, further defined by sampling said second voltage to produce a control signal for each predetermined incremental variation in amplitude thereof, and initiating said sampling periods by said control signals.

4. A method of integration comprising the steps of sampling a first variable voltage to produce a control signal for each incremental variation of predetermined amplitude therein, sampling a second variable voltage once for each of said control signals to produce a plurality of voltages, and adding together said latter voltages to form a summation thereof proportional to the integral of the second voltage with respect to the first.

5. A method of integration as claimed in claim 4, further characterized by establishing both positive and negative values of said second voltage, and sampling said second voltage as regards negative and positive values thereof in accordance with the decrease and increase of said first voltage, respectively.

6. A method of integrating with respect to a dependent variable comprising the steps of representing an integrand by first and second variable voltages with the second of same being provided in both positive and negative polarity, sampling and holding said first variable voltage to produce a control signal for each variation therein of a predetermined amplitude, said control signal also being indicative of the direction of change of said first voltage, establishing sampling periods of predetermined duration by said control signals, sampling said second variable voltage during said sampling periods with the polarity of second voltage sampled being controlled by the direction of change of said first voltage, whereby a plurality of voltage values of said second voltage are obtained by said latter sampling step, and adding together the plurality of voltages of said latter sampling to form a summation thereof whereby such summation is proportional to the integral of the first and second voltages.

7. An integrator for an analog computer comprising at least two input terminals adapted to receive varying input signals, a sample-and-hold circuit, first switching means connecting said sample-and-hold circuit to a first of said input terminals, control means, means connected to both said first input terminal and said sample-and-hold circuit for producing a control signal from the combination thereof and applying same to said control means, a sampling circuit connected to the second of said input terminals through second switching means and including an accumulator connected to an output terminal, and a timing circuit including third switching means operated in response to said control signal and including switch control means actuating first and second switching means, whereby the signal at said second input terminal is sampled at intervals determined by the rate of change of voltage at said first input terminal and such samples are accumulated to form a summation thereof, whereby such summation is proportional to the integral of the voltage at said second terminal with respect to the voltage at said first input terminal, regardless of the dependency of said voltages.

8. In integrator for an analog computer as claimed in claim 7, further characterized by a pair of second input terminals adapted to receive positive and negative polarity signal voltages, respectively, of the input voltage thereat, and further switching means controlled by the polarity of said control signal for connecting said accumulator to the one of said second input terminals corresponding in polarity to the polarity of control signals.

9. An integrator circuit for an analog function generator comprising a first circuit adapted to receive a variable input voltage and including switching means interrupting the input voltage thereto and producing control voltages equal to the difference between input voltages during consecutive sampling periods, a timing circuit connected to receive said control voltages for actuating switch control means for a predetermined period of time, means connecting said switch control means to the switch of said first circuit, and a second circuit adapted to receive a variable input voltage and including an accumulator having switching means at the input thereof controlled by the switch control means of said timing circuit for performing a summation of successive values of the input voltage thereto, whereby said summation is proportional to the integral of the variable voltage received by said sampling circuit multiplied by the differential of the variable voltage received by said first circuit.

10. An improved analog computer circuit as defined in claim 9, further characterised by an integrating circuit connected to the input of the first circuit for applying thereto the integral with respect to time of a variable voltage, whereby the ouput of the improved computer circuit is proportional to the integral of the product of the two variable voltages with respect to time.

11. A function generator comprising a generalized integrator circuit adapted to receive a pair of input signals and to produce an output signal proportional to the integral of a first input signal times the differential of a second input signal, a first input terminal adapted to receive a variable voltage, a pair of summing amplifiers with one input of each connected to said first input terminal, a second input terminal adapted to receive a voltage of minus one and connected to another input of the first of said summing amplifiers, means connecting the output of the first of said summing amplifiers to an input of said generalized integrating circuit, means connecting the output of said generalized integrating circuit to another input of the second of said summing amplifiers, and means connecting the output of the second of said summing amplifiers to the other input of said generalized integrating circuit and to an output terminal, whereby the voltage appearing at said output terminal is proportional to the logarithm of a variable voltage applied to said first input terminal.

12. A function generator comprising a generalized integrating circuit adapted to produce at the output thereof signals which are proportional to the integral of a voltage applied to a first input terminal thereof times the differential of a voltage applied to a second input terminal thereof, a first summing amplifier having the output thereof connected to the first input terminal of said generalized integrating circuit and one input thereof connected to receive a voltage of minus one value, a second summing amplifier having one input thereof connected to the output of said generalized integrating circuit and another input thereof connected to receive a variable voltage, and means connecting the output of said second summing amplifier to the second input terminal of said generalized integrating circuit and to another input of said first summing amplifier as well as to an output terminal, whereby the voltage appearing at said output terminal is proportional to the square root of a variable voltage applied to the input of said second summing amplifier.

13. An integrator for integrating a first input signal representing the integrand with respect to a second input signal representing the integration variable comprising means responsive to said second input signal for providing a first control signal whenever said second input signal varies a predetermined amount, means responsive to said control signal for providing a second control signal of predetermined time width, means responsive to said second control signal for obtaining a plurality of values of said first input signal, and means for adding said plurality of values of said first input signal to obtain an output signal proportional to the integral of said first input signal with respect to said second input signal.

References Cited

UNITED STATES PATENTS 2,792,988  5/1957  Goldberg _____ 235—183

OTHER REFERENCES

Klein et al.: "Digital Differential Analyzer," Instruments and Automation, vol. 30, pages 1105 to 1109, June 1957.

MALCOLM A. MORRISON, *Primary Examiner.*

FELIX D. GRUBER, *Assistant Examiner.*

U.S. Cl. X.R.

328—127, 151; 235—197